United States Patent [19]

Okubo

[11] Patent Number: 5,185,702
[45] Date of Patent: Feb. 9, 1993

[54] VEHICLE ANTI-LOCK CONTROL APPARATUS AND METHOD

[75] Inventor: Satomi Okubo, Saitama, Japan

[73] Assignees: Akebono Research and Development Centre Ltd., Hanyu; Akebono Brake Co., Ltd., Tokyo, both of Japan

[21] Appl. No.: 825,816

[22] Filed: Jan. 21, 1992

Related U.S. Application Data

[63] Continuation of Ser. No. 578,622, Sep. 7, 1990, abandoned.

[30] Foreign Application Priority Data

Sep. 8, 1989 [JP] Japan .................................. 1-231720
Sep. 28, 1989 [JP] Japan .................................. 1-250741
Dec. 27, 1989 [JP] Japan .................................. 1-336493

[51] Int. Cl.$^5$ .............................................. B60T 8/32
[52] U.S. Cl. ................................ 364/426.02; 180/197; 303/95; 303/103
[58] Field of Search .................. 364/426.01, 426.02, 364/426.04; 303/95, 96, 100, 102, 103, 105, 106, 109; 180/197

[56] References Cited

U.S. PATENT DOCUMENTS

| 4,666,218 | 5/1987 | Masaki et al. | 303/106 |
|---|---|---|---|
| 4,671,579 | 6/1987 | Sawano et al. | 303/95 |
| 4,762,375 | 8/1988 | Maki et al. | 303/96 |
| 4,763,260 | 8/1988 | Sakuma et al. | 364/426 |
| 4,797,825 | 1/1989 | Shimanuki et al. | 364/426.02 |
| 4,991,910 | 2/1991 | Shimanuki et al. | 303/109 |

Primary Examiner—Thomas G. Black
Assistant Examiner—Collin W. Park
Attorney, Agent, or Firm—Cushman, Darby & Cushman

[57] ABSTRACT

An anti-lock control apparatus and method in which the brake hydraulic pressure is controlled by regarding an estimated vehicle speed as an actual vehicle speed, is characterized in that the estimated vehicle speed is corrected when the estimated vehicle speed is extremely reduced relative to the actual vehicle speed when the four wheel speeds are reduced at the same time, or the like, thereby preventing the estimated vehicle speed from being away from the actual speed. It can be applied as the correction of the estimated vehicle speed that the estimated vehicle speed may be maintained at a constant value, and the deceleration and acceleration of the estimated vehicle speed may be varied in accordance with a friction coefficient of the road surface.

14 Claims, 7 Drawing Sheets

CORRECTION ROUTINE FOR ESTIMATED VEHICLE SPEED

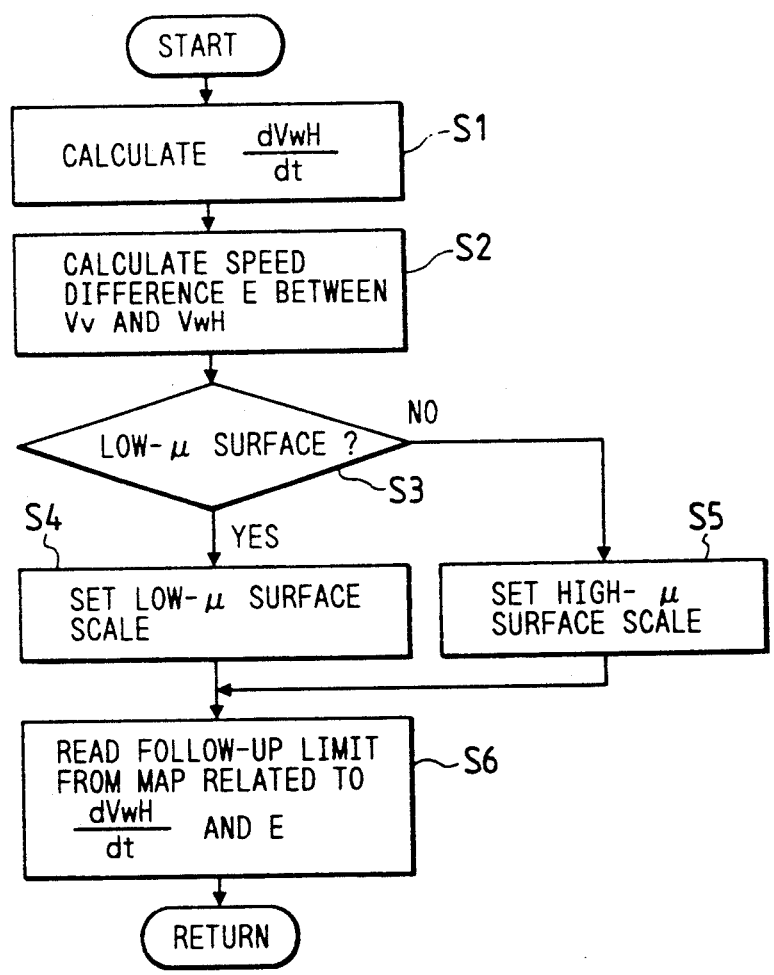

VEHICLE ANTI-LOCK CONTROL APPARATUS AND METHOD

This is a continuation of application Ser. No. 07/578,662, filed on Sep. 7, 1990, which was abandoned upon the filing hereof.

BACKGROUND OF THE INVENTION

This invention relates to an anti-lock control method for preventing a wheel lock when braking a running vehicle.

Generally, in an anti-lock control apparatus for a vehicle, for the purpose of securing the steerability and the running stability of the vehicle and of reducing the braking distance when braking the vehicle, a control mode of brake hydraulic pressure is determined in accordance with an electric signal representative of a wheel speed (rotational speed) detected by a wheel speed sensor, and a hold valve in the form of a normally-open solenoid valve and a decay valve in the form of a normally-closed solenoid valve are opened and closed, so that the brake hydraulic pressure is controlled by a control unit, including a microcomputer, to be increased (pressurized), held and decreased.

FIG. 1 is a block diagram of a conventional 3-channel anti-lock control apparatus for performing such anti-lock control. Outputs of wheel speed sensors 1 to 4 are fed respectively to arithmetic circuits 5 to 8, and are calculated to produce signals respectively representing wheel speeds Vw1 to Vw4. The left front wheel speed Vw1 and the right front wheel speed Vw2 are directly fed, as first and second system speeds Vs1 and Vs2, to first and second control logic circuits 9 and 10, respectively. A lower one out of the left rear wheel speed Vw3 and the right rear wheel speed Vw4 is selected by a low-select circuit 11, and is fed, as a third system speed Vs3, to a third control logic circuit 12.

The signals representing the wheel speed Vw1 to Vw4, respectively, are fed to an estimated vehicle speed calculating circuit 13 comprising a high-select circuit 14 and a filter circuit 15. In this calculating circuit 13, the highest wheel speed VwH among the four wheel speeds Vw1 to Vw4 is selected (four-wheel select-high) by the high-select circuit 14, and a speed whose follow-up limit relative to the highest wheel speed VwH is restricted to a range, for example, of $\pm 1G$ is obtained by the filter circuit 15, and is fed, as an estimated vehicle speed Vv approximating an actual vehicle speed, to the control logic circuits 9, 10 and 12. In the control logic circuits 9, 10 and 12, the system speeds Vs1 to Vs3 are used respectively as control vehicle speeds (herein after referred to as "system speed Vs") of the channels, and the ON-OFF control of the hold valve HV and the decay valve DV is effected by using this system speed Vs and the estimated vehicle speed Vv as a reference.

In the above anti-lock control method, the estimated vehicle speed Vv is an important factor for the reference speed for the anti-lock control. Therefore, in the case where the four wheel speeds Vw1 to Vw4 are reduced at the same time by braking of the vehicle, the estimated vehicle speed Vv calculated based on the highest wheel speed VwH among the four wheel speeds is also reduced as shown in FIG. 2, so that the difference between the estimated vehicle speed Vv and the actual vehicle speed becomes greater. Due to this, there has been encountered a problem that when the control is effected based on the estimated vehicle speed Vv, the control can not be carried out in a stable manner.

SUMMARY OF THE INVENTION

It is, therefore, an object of this invention to provide an anti-lock control method by which an estimated vehicle speed Vv is prevented from being away from an actual vehicle speed when four wheels speeds are reduced at the same time, thereby effecting a stable control.

In order to attain the above-noted and other objects, an anti-lock control apparatus is provided with correcting means for correcting the estimated vehicle speed, Vv, calculated by the manner described below, when the estimated vehicle speed, Vv, is extremely reduced relative to the actual vehicle speed due to the fact that all of the four wheels of the vehicle are reduced at the same time during the braking of the vehicle. The estimated vehicle speed, Vv, used above, is calculated as an approximate value of the actual vehicle speed by restricting the acceleration-side and deceleration-side follow-up limits relative to the highest wheel speed, VwH, respectively, to predetermined ranges of the acceleration and deceleration.

Specifically, in the present invention, there is prepared a map by which a follow-up limit of an estimated vehicle speed is represented in connection with the relation between the difference between the estimated vehicle speed Vv and the highest wheel speed VwH and the acceleration/deceleration of the highest wheel speed VwH.

The map may be varied in scale in accordance with the degree of a friction coefficient of the road surface. The follow-up limit of the estimated vehicle speed Vv is varied by reading of the map in such a manner that the difference between the estimated vehicle speed Vv and the actual vehicle speed becomes less.

Also, in the present invention, a threshold value VT1 following the estimated vehicle speed Vv with a predetermined speed difference is set, and the deceleration of the estimated vehicle speed Vv is stopped during the time when the highest wheel speed VwH is below the threshold value VT1, and correction is made in such a manner that the value of the estimated vehicle speed Vv obtained at the time of the above stop can be maintained.

BRIEF DESCRIPTION OF THE DRAWINGS

In the accompanying drawings:

FIG. 8 is a flow chart showing the operation of the first embodiment of the present invention, in which the surface μ decision circuit is provided;

DETAILED DESCRIPTION OF THE PREFERRED EMBODIMENTS

Preferred embodiments of the present invention will be hereinafter described in detail with reference to the accompanying drawings.

FIG. 3 through FIG. 9 show an anti-lock control method for correcting an estimated vehicle speed according to a first embodiment of the present invention.

Figure 1:
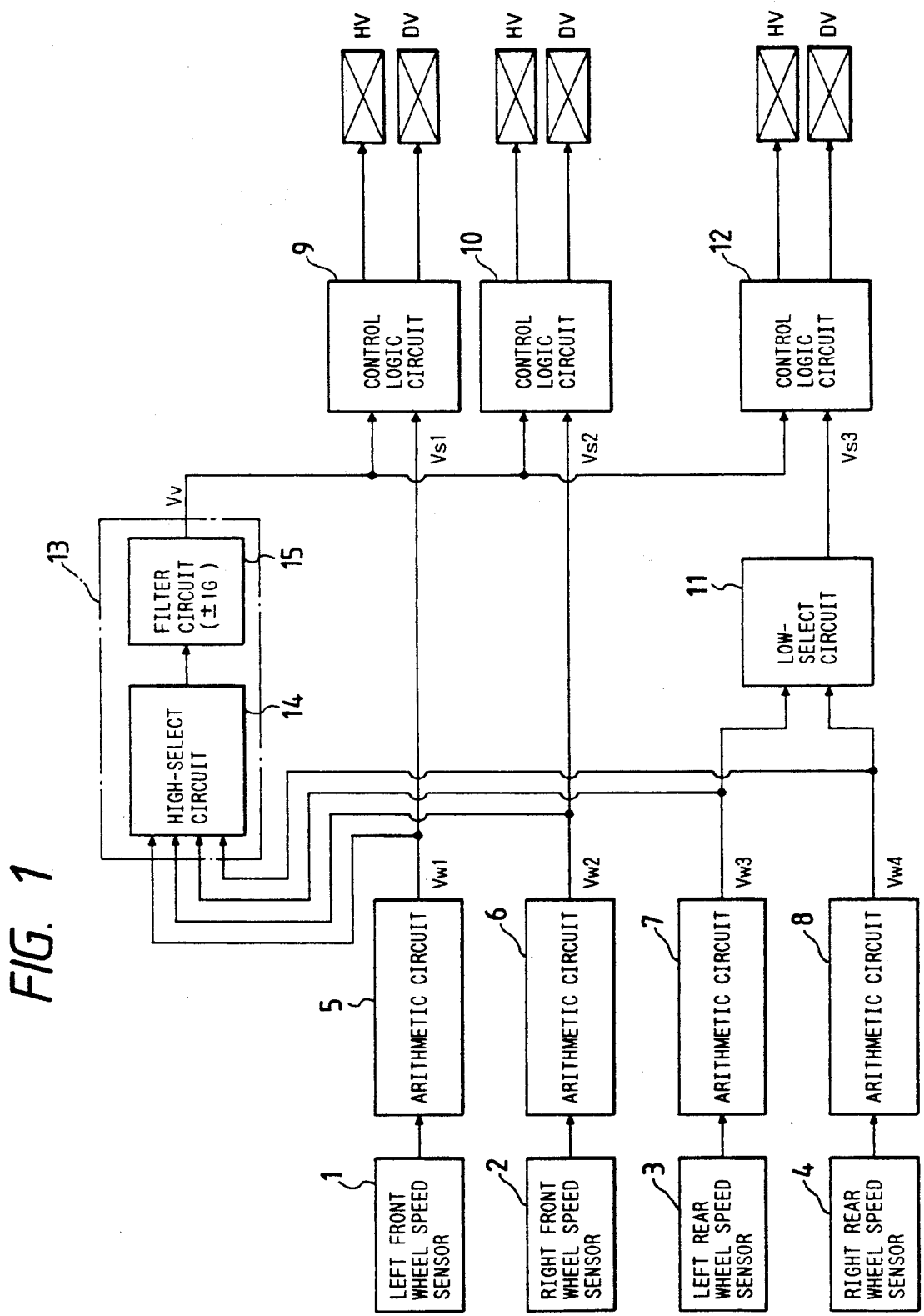
FIG. 1 is a block diagram of a 3-channel anti-lock control apparatus to which a conventional anti-lock control method is applied.
Figure 2:
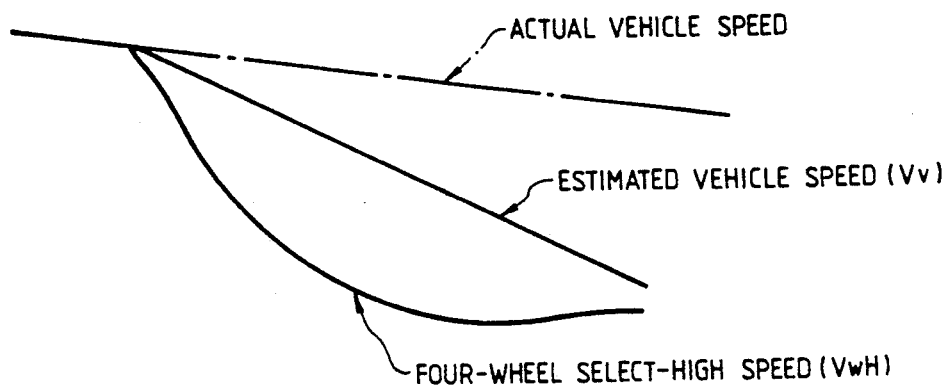
FIG. 2 is a view showing an estimated vehicle speed in the conventional method.
Figure 9:
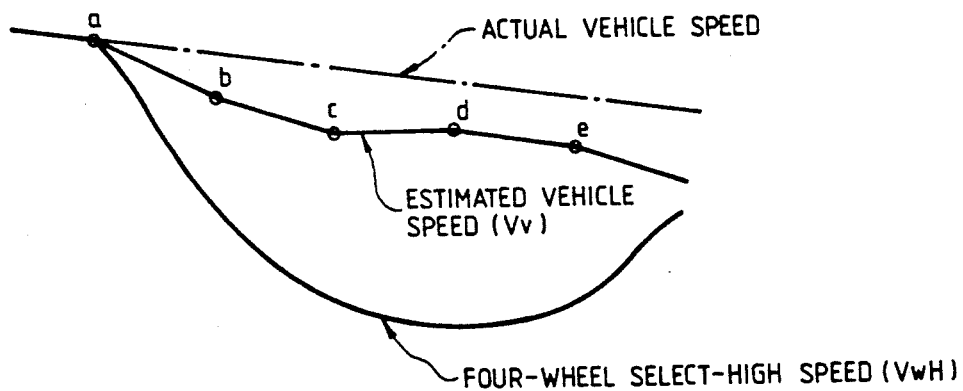
FIG. 9 is a timing chart showing a method of setting the follow-up limit in accordance with the first embodiment of the present invention.
Figure 4:
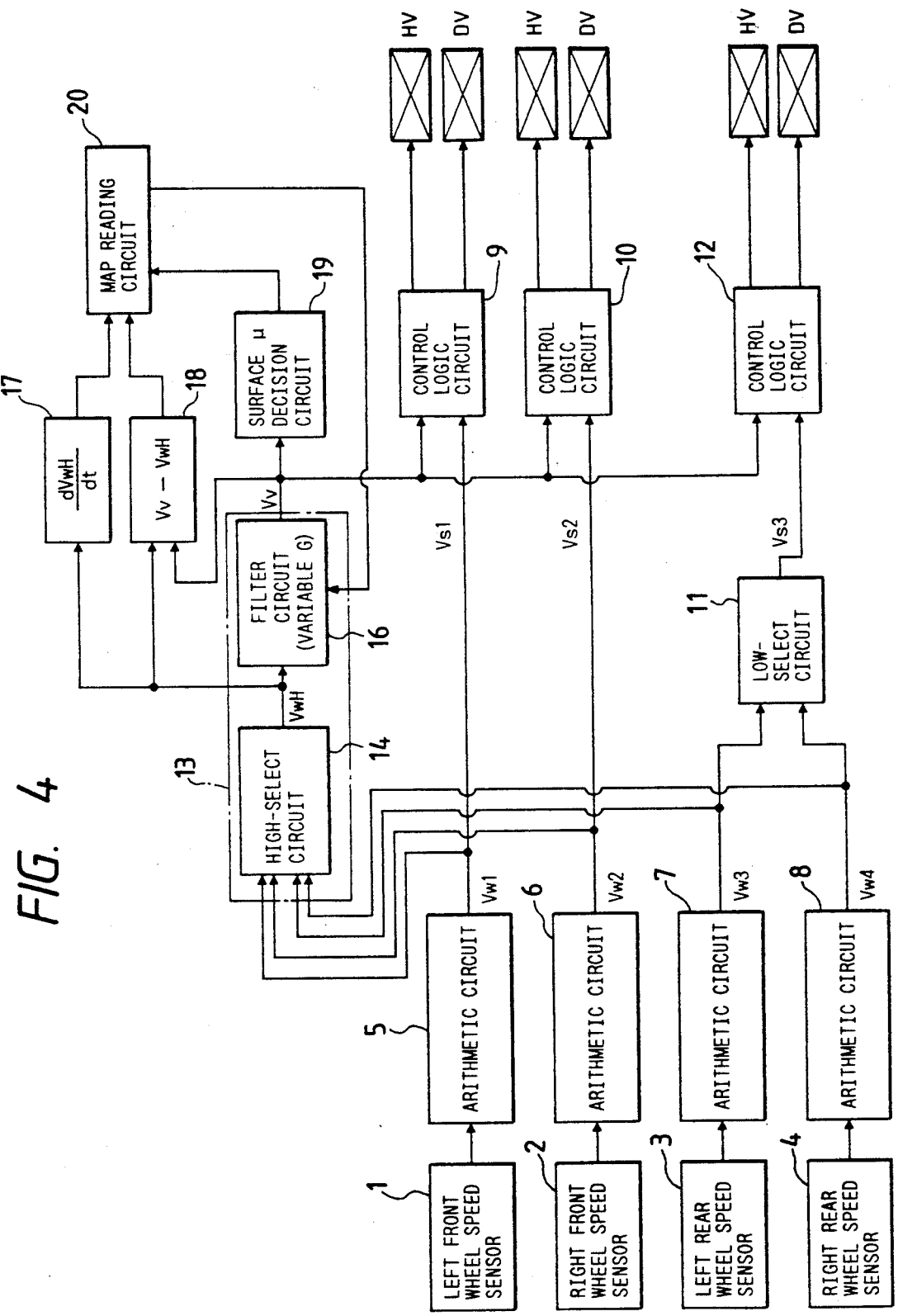
FIG. 4 is a block diagram of a 3-channel anti-lock control apparatus to which the first embodiment of the present invention is applied with providing the surface $\mu$ decision circuit.

FIG. 4 is a block diagram of a 3-channel anti-lock control apparatus to which an anti-lock control method of the present invention is applied. Most portions of the construction of FIG. 4 are identical to those of FIG. 1, and therefore the corresponding portions are denoted respectively by identical reference numerals, and repeated explanation of these portions is omitted.

Figure 6A:
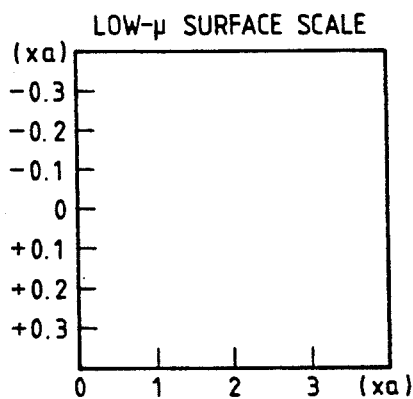
FIGS. 6A and 6B are views showing scales used in the map.
Figure 6B:
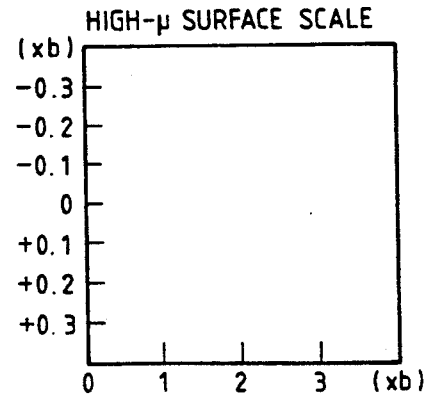

In the construction shown in FIG. 4, an estimated vehicle speed calculating circuit 13 comprises a high-select circuit 14 for selecting the highest wheel speed VwH among four wheel speeds Vw1 to Vw4 (four-wheel select-high), and a variable filter circuit 16 for restricting a follow-up limit of the deceleration side relative to the four-wheel select-high speed VwH to a variable deceleration range. The construction further comprises a differentiating circuit 17 for calculating the acceleration and deceleration dVwH/dt of the four-wheel select-high speed VwH obtained at the high-select circuit 14, a subtracting circuit 18, a surface μ decision circuit 19, and a map reading circuit 20. The subtracting circuit 18 is a circuit for finding the difference E (=Vv−VwH) between the estimated vehicle speed Vv and the four-wheel select-high speed VwH. The surface μ decision circuit 19 is preferably provided for deciding a friction coefficient μ (hereinafter referred to as "surface μ") of the running surface from the gradient of the deceleration of the estimated vehicle speed Vv. The map reading circuit 20 is a circuit for reading the follow-up limit from a map in which the follow-up limit of the deceleration side of the estimated vehicle speed Vv is represented in connection with the relation between the acceleration and deceleration dVwH/dt obtained by the differentiating circuit 17 and the speed difference E (=Vv−VwH) obtained by the subtracting circuit 18. When the reading from the map is to be effected, in accordance with the result of decision of the surface μ given by the surface μ decision circuit 19, one of low-μ and high-μ surface map scales shown in FIGS. 6(A) and 6(B) is selected or set. Then, the follow-up limit of the estimated vehicle speed Vv obtained by the map reading circuit 20 is again inputted to the filter circuit 16 to change the follow-up limit of the estimated vehicle speed Vv.

Figure 5:
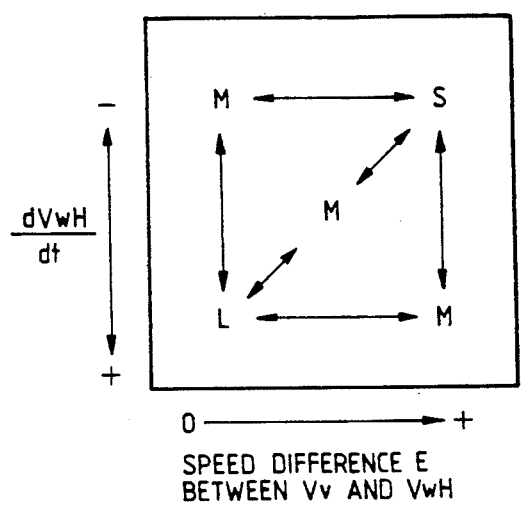
FIG. 5 is a map representative of a follow-up limit of an estimated vehicle speed, where S, M, & L denote small, medium, and large, respectively.

FIG. 5 shows the map for determining the above follow-up limit of the estimated vehicle speed Vv. In this map, the abscissa axis represents the speed difference E between the estimated vehicle speed Vv and the four-wheel select-high speed VwH, and the ordinate axis represents the acceleration and deceleration dVwH/dt of the four-wheel select-high speed VwH.

In the map, the scales of the abscissa axis and ordinate axis are adapted to be varied in accordance with the decision result outputted from the surface decision circuit 19. More specifically, when it is decided that the running surface is a low-μ surface, the low-μ surface scale of FIG. 6(A) is set, and when it is decided that the running surface is a high-μ surface, the high-μ surface scale of FIG. 6(B) is set.

However, with respect to factors a and b (representing the scale magnification) provided at the abscissa and ordinate axes of the two scales of FIG. 6(A) and FIG. 6(B), "a<b" is provided. For deciding the surface μ by the surface μ decision circuit 19, for example, there may be used a method (known per se) for deciding the surface μ from the degree of the gradient of the deceleration of the estimated vehicle speed Vv.

FIG. 8 is a flow chart showing a method of setting the above follow-up limit. First, in Step S1, the acceleration and deceleration dVwH/dt of the four-wheel select-high speed VwH is calculated by the differentiating circuit 17. In the next Step S2, the speed difference E between the estimated vehicle speed Vv and the four-wheel select-high speed VwH is calculated by the subtracting circuit 18. In the next Step S3, the surface μ of the running surface is decided by the surface μ decision circuit 19. Namely, it is decided whether or not the running surface is a low μ-surface, and if this result is "YES", then in Step S4, the low-μ surface scale of FIG. 6(A) is set as the scale of the map. If the decision result of Step S3 is "NO", the high-μ surface scale of FIG. 6(B) is set in Step S5. In the next Step S6, one of the low-μ and high-μ scales set respectively in Steps S4 and S5 is applied to the map of FIG. 5, and the follow-up limit of the estimated vehicle speed Vv is read from the map by the map reading circuit 20. Then, in accordance with the value of this reading, the follow-up limit of the variable filter circuit 16 is varied, so that the estimated vehicle speed Vv is represented by a broken line shown in FIG. 9. Namely, at point a in FIG. 9, there is no speed difference between the four-wheel select-high speed VwH and the estimated vehicle speed Vv, and the acceleration and deceleration dVwH/dt of the speed VwH is small, and therefore the value of the follow-up limit read from the map of FIG. 5 is large. At point b a predetermined time period after the point a, a speed difference develops between the speed VwH and the speed Vv, and the deceleration dVwH/dt of the speed VwH is large, and therefore the follow-up limit smaller in value than at the point a is read. Subsequently, this reading operation is repeated sequentially in the order of points c, d, e . . . , and the follow-up limit of the estimated vehicle speed Vv is varied and set in such a manner that the difference between the estimated vehicle speed Vv and the actual vehicle speed becomes less.

As is apparent from the above-explanation, the anti-lock control method according to a first embodiment of the present invention can be effected without using the surface μ decision circuit 19, in order to provide the estimated vehicle speed Vv prevented from being away from an actual speed when four wheels speeds are reduced at the same time.

Figure 3:
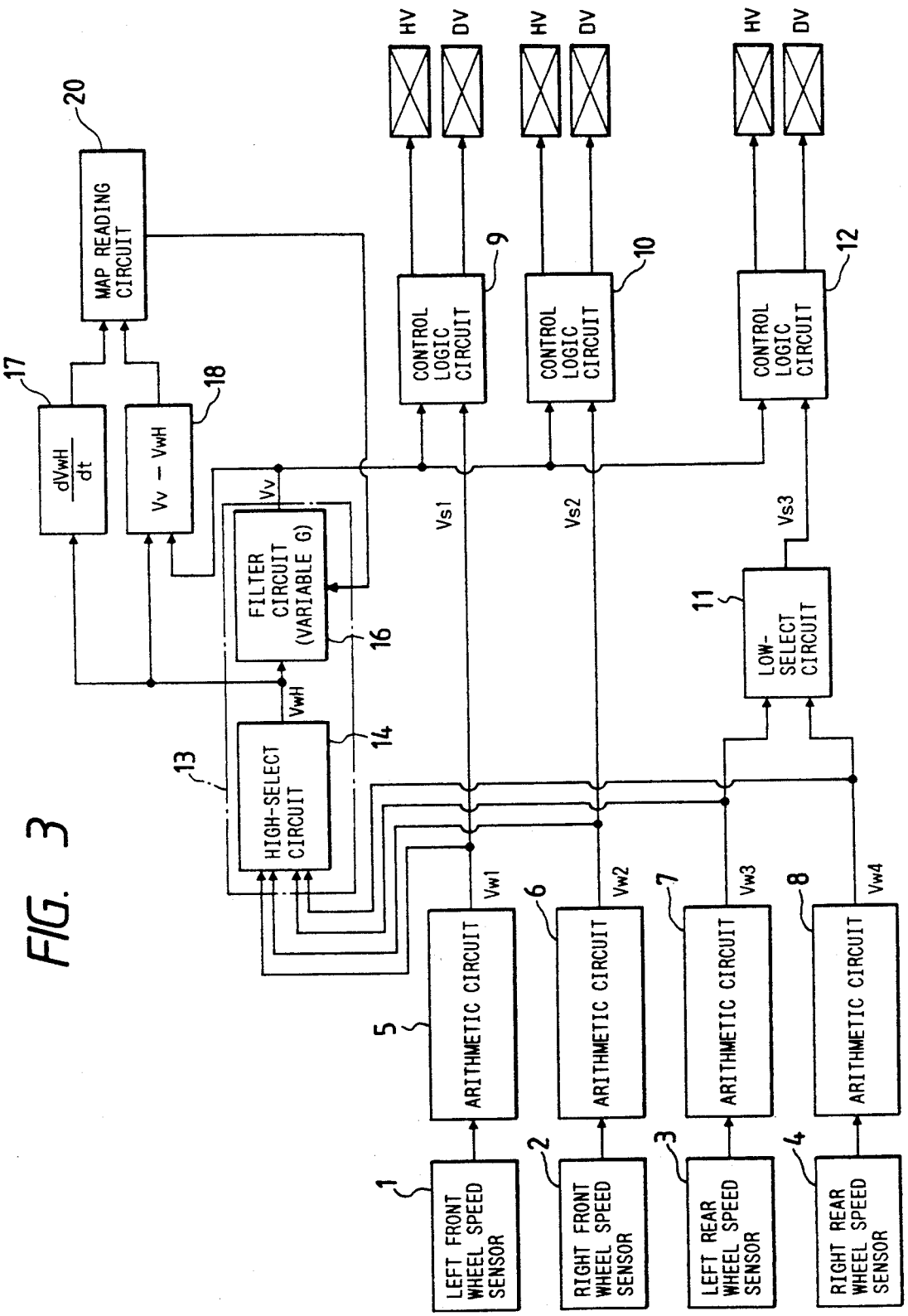
FIG. 3 is a block diagram of a 3-channel anti-lock control apparatus to which a first embodiment of the present invention is applied with omitting a surface $\mu$ decision circuit.
Figure 7:
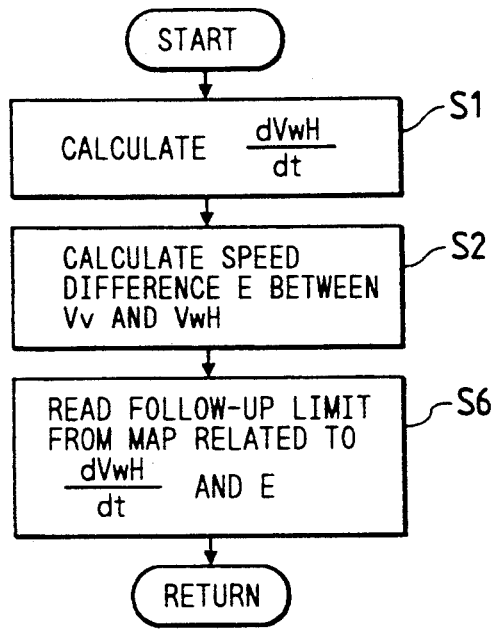
FIG. 7 is a flow chart showing the operation of the first embodiment of the present invention, in which the surface μ decision circuit is omitted.

FIGS. 3 shows another block diagram of a 3-channel anti-lock apparatus with omitting the surface μ decision circuit 19 from that shown in FIG. 4, and FIG. 7 shows a flow chart with omitting steps 3, 4 and 5 of that shown in FIG. 8.

As is clear from the foregoing, in the present invention, there is prepared the map representing the follow-up limit of the estimated vehicle speed Vv, and the follow-up limit is varied by the reading of the map. Therefore, even when the four wheels are directed to the lock at the same time, the difference between the actual vehicle speed and the estimated vehicle speed Vv can be made small, thereby stabilizing the control.

In the present invention, also, when the reading of the map is to be effected, the scale of the map is varied in accordance with variations of the surface μ. Therefore, using the same map, the follow-up limit of the estimated vehicle speed Vs can be read and set in a manner to cover all the surface conditions, from the low-μ surface to the high-μ surface. Therefore, even when the surface condition is varied, the control can be effected in a more stable and reliable manner.

Next, another anti-lock control method according to a second embodiment of the present invention will now be described in detail with reference to the accompanying drawings.

Figure 10:
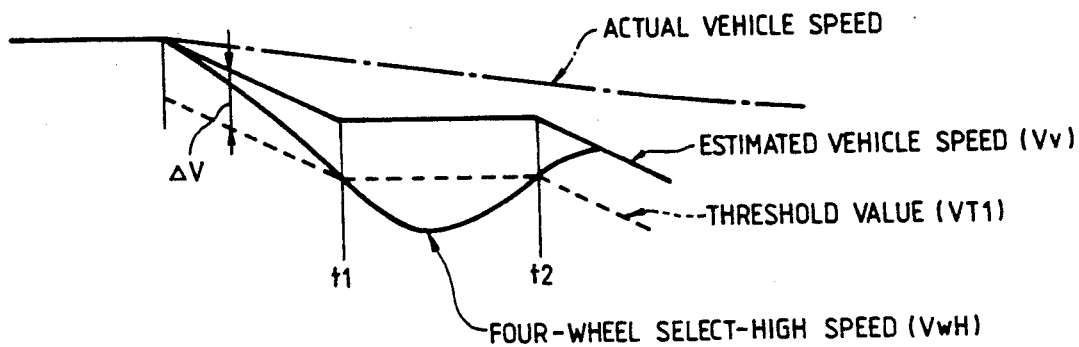
FIG. 10 is a timing chart showing a method of correcting an estimated vehicle speed in accordance with a second embodiment of the present invention.

FIG. 10 shows a method of correcting an estimated vehicle speed Vv according to the second embodiment of the present invention. There is set a threshold value VT1 which follows the estimated vehicle speed Vv (which decelerates with a deceleration gradient −1G) with a predetermined speed difference ΔV. When the highest wheel speed (four-wheel select-high speed) VwH among the four wheel speeds goes below the threshold value VT1 at time t1, the deceleration of the estimated vehicle speed Vv is stopped from this time t1, and correction is made in such a manner that the estimated vehicle speed Vv is kept constant. Therefore, from time t1, since the threshold value VT1 follows the estimated vehicle speed with the predetermined speed deference ΔV, the threshold value VT1 is also kept at a constant speed Vv−ΔV. Then, when the four-wheel select-high speed VwH goes above the threshold value VT1 at time t2, the deceleration of the estimated vehicle speed Vv is resumed from this time t2 with a deceleration gradient −G.

Figure 11:
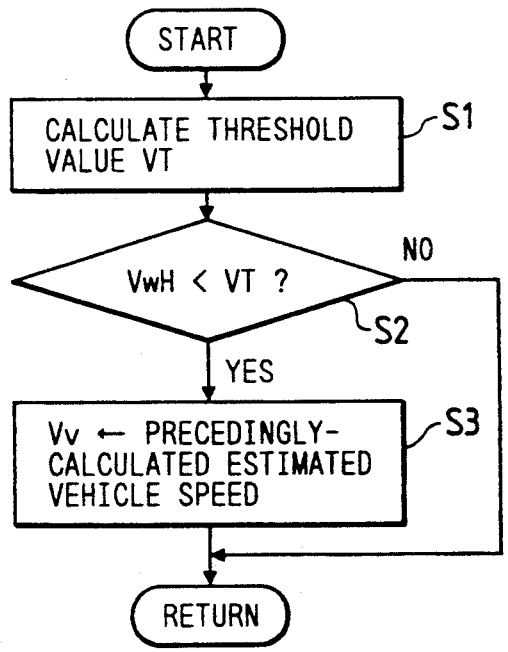
FIG. 11 is a flow chart of a correction routine for the estimated vehicle speed in accordance with the second embodiment of the present invention.

FIG. 11 shows a flow chart of a correction routine for the estimated vehicle speed Vv.

Referring to FIG. 11, first, in Step S1, the threshold value VT1 following the estimated vehicle speed Vv with the predetermined speed difference ΔV is calculated. In the next Step S2, it is judged whether or not the four-wheel select-high speed VwH is below the threshold value VT1. At the time when VwH<VT1 is obtained, the program proceeds to Step S3 in which correction is made in such a manner that the precedingly-calculated estimated vehicle speed Vv is maintained.

As is clear from the foregoing, in the present invention, when the four-wheel select-high speed VwH goes below the threshold value VT1, it is judged by this that the four wheels are directed toward the lock at the same time, so that the deceleration of the estimated vehicle speed Vv is stopped. During the time when the speed VwH is below the threshold value VT1, the value of the speed Vv obtained when stopping the deceleration of the speed Vv is maintained. Therefore, there does not occur a remarkable speed difference between the actual vehicle speed and the estimated vehicle speed Vv, so that the anti-lock control can be effected in a stable manner.

what is claimed is:

1. An anti-lock control method for a vehicle having one or more wheels, each of said wheels having at least on associated brake and an associated wheel number, said method comprising the steps of:
    (a) generating, using a wheel velocity sensor, a single for each wheel VwX, where X is the wheel number;
    (b) processing each signal VwX so as to be representative of the speed of its associated wheel;
    (c) comparing the processed wheel speed signals and generating a single VwH representing the highest wheel speed;
    (d) filtering the signal VwH when a threshold signal VT1 has been generated and the signal VwH is less than the threshold signal VT1 using a limiting filter to generate a signal Vv representing an estimated vehicle speed, wherein said filter applies restricted acceleration-side and deceleration-side follow-up limits set to predetermined ranges of acceleration and deceleration;
    (e) generating said threshold signal VT1 equivalent to the signal Vv less an offset value equal to a predetermined signal difference; and
    (f) controlling the brakes responsive to at least the signal Vv.

2. An anti-lock method for a vehicle having one or more wheels, each of said wheels having at least one associated brake and an associated wheel number, said method comprising the steps of:
    (a) generating, using a wheel velocity sensor, a signal for each wheel VwX, where X is the wheel number;
    (b) processing each signal VwX so as to be representative of the speed of its associated wheel;
    (c) comparing the processed wheel speed signals and generating a signal VwH representing the highest wheel speed;
    (d) filtering the signal VwH using a limiting filter to generate a signal Vv representing an estimated vehicle speed, where said filter applies restricted acceleration-side and deceleration-side follow-up limits set to predetermined ranges of acceleration and deceleration;
    (e) preparing a map of follow-up limits where said limits vary as a function of the relation between: 1) the difference between the signal Vv and the signal VwH, and 2) the acceleration/deceleration of the signal VwH;
    (f) reading said map to re-set the deceleration and acceleration follow-up limits; and
    (g) controlling the brakes responsive to at least the signal Vv.

3. The anti-lock control method for a vehicle according to claim 2, further comprising the steps of:
    generating a signal μ, representative of the degree of friction coefficient of the rod surface; and
    processing the signal μ to generate different scales for the map of follow-up limits.

4. An anti-lock control method for a vehicle having one or more wheels, each of said wheels having at least one associated brake and an associated wheel number, said method comprising the steps of:
    (a) generating, using a wheel velocity sensor, a signal for each wheel VwX, where X is the wheel number;

(b) processing each signal VwX so as to be representative of the speed of tis associated wheel;
(c) comparing the processed wheel speed signals and generating a signal VwH representing the highest wheel speed;
(d) filtering the signal VwH when a skip signal is asserted, using a limiting filter to generate a signal Vv representing an estimated vehicle speed, where said filter applies restricted limits so that the acceleration and the deceleration of the signal VwH are restricted to predetermined ranges;
(e) generating a threshold signal VT1 representing the signal Vv less an offset value equal to a speed differential ΔV;
(f) comparing the signal VwH to the threshold signal VT1 and when the signals are equal storing the value of Vv;
(g) comparing the signal VwH to the threshold signal VT1 and when the threshold signal VT1 is greater than the signal VwH then:
  1) setting the value of the signal Vv to the value stored in step (f); and
  2) asserting a skip signal; and
(h) controlling the brakes responsive to at least the signal Vv.

5. An anti-lock control method for a vehicle having one or more wheels, each of said wheels having at least one associated brake and an associated wheel number, said method comprising the steps of:
(a) generating, using a wheel velocity sensor, a signal for each wheel VwX, where X is the wheel number;
(b) processing each signal VwX so as to be representative of the speed of tis associated wheel;
(c) comparing the processed wheel speed signals and generating a signal VwH representing the highest wheel speed;
(d) filtering the signal VwH using a limiting filter to generate a signal Vv representing an estimated vehicle speed, where said filter applies restricted limits so that the acceleration and the deceleration of the signal VwH are restricted to predetermine ranges;
(e) processing the signal VwH to generate the signal dVwH/dt representing the acceleration and deceleration of the signal VwH;
(f) processing the signals Vv and VwH to generate the signal E, representing the difference between Vv and VwH;
(g) using the signals dVwH/dt and E generated in steps (e) and (f), respectively, to read a map to re-set the deceleration and acceleration follow-up limits; and
(h) controlling the brakes responsive to at least the signal Vv.

6. The anti-lock control method according to claim 5, further comprising the step of:
reading a map where the abscissa axis of said map represents the difference, E, and the ordinate thereof represents the acceleration and deceleration, dVwH/dt.

7. The anti-lock control method according to claim 6, further comprising the steps of:
processing the signal Vv to generate a signal representing the deceleration and acceleration of the signal Vv;
processing the signal generated int he previous step to generate a signal μ, representing the degree of friction coefficient of the road surface; and
processing the signal μ to generate different scales for the abscissa and ordinate axes, respectively, of the map of follow-up limits.

8. An anti-lock control apparatus for a vehicle having one or more wheels, each of said wheels having at least one associated brake and an associated wheel number, said apparatus comprising:
means for generating, using a wheel velocity sensor, a signal for each wheel VwX, where X is the wheel number;
means for processing each signal VwX so as to be representative of the speed of its associated wheel;
means for comparing the processed wheel speed signals and generating a signal VwH representing the highest wheel speed;
means for filtering the signal VwH when a threshold signal VT1 has been generated and the signal VwH is less than the threshold signal VT1 using a limiting filter to generate a signal Vv representing an estimated vehicle speed, where said filter applies restricted acceleration-side and deceleration-side follow-up limits set to predetermined ranges of acceleration and deceleration;
means for generating said threshold signal VT1 equivalent to the signal Vv less an offset value equal to a predetermined signal difference; and
means for controlling the brakes, said controlling means being responsive to at least the signal Vv.

9. An anti-lock apparatus for a vehicle having one or more wheels, each of said wheels having at least one associated brake and an associated wheel number, said apparatus comprising:
means for generating, using a wheel velocity sensor, a signal for each wheel VwX, where X is the wheel number;
means for processing each signal VwX so as to be representative of the speed of its associated wheel;
means for comparing the processed wheel speed signals and generating a signal VwH representing the highest wheel speed;
means for filtering the signal VwH using a limiting filter to generate a signal Vv representing an estimated vehicle speed, where said filter applies restricted acceleration-side and deceleration-side follow-up limits set to predetermined ranges of acceleration and deceleration;
means for preparing a map of follow-up limits where said limits vary as a function of the relation between: 1) the difference between the signal Vv and the signals VwH, and 2) the acceleration/deceleration of the signal VwH;
means for reading said map to re-set the deceleration and acceleration follow-up limits; and
means for controlling the brakes, said controlling means being responsive to at least the signal Vv.

10. The anti-lock control apparatus for a vehicle according to claim 9, further comprising:
means for generating a signal μ, representative of the degree of friction coefficient of the road surface; and
means for processing the signal μ to generate different scales for the map of follow-up limits.

11. An anti-lock control apparatus for a vehicle having one or more wheels, each of said wheels having at least one associated brake and an associated wheel number, said apparatus comprising:

means for generating, using a wheel velocity sensor, a signal for each wheel VwX, where X is the wheel number;

means for processing each signal VwX so as to be representative of the speed of its associated wheel;

means for comparing the processed wheel speed signals and generating a signal VwH representing the highest wheel speed;

means for filtering the signal VwH when a skip signal is asserted, using a limiting filter to generate a signal Vv representing an estimated vehicle speed, where said filter applies restricted limits so that the acceleration and the deceleration of the signal VwH are restricted to predetermined ranges;

means for generating a threshold signal VT1 representing the signal Vv less an offset value equal to a speed differential $\Delta V$;

means for comparing the signal VwH to the threshold signal VT1 and when the signals are equal storing the value of Vv;

means for comparing the signal VwH to the threshold signal VT1 and when the threshold signal VT1 is greater than the signal VwH then:
1) setting the value of the signal Vv to the value stored; and
2) asserting a skip signal; and means for controlling the brakes, said controlling means responsive to at least the signal Vv.

12. An anti-lock control apparatus for a vehicle having one or more wheels, each of said wheels having at least one associated brake and an associated wheel number, said apparatus comprising:

means for generating, using a wheel velocity sensor, a signal for each wheel VwX, where X is the wheel number;

means for processing each signal VwX so as to be representative of the speed of its associated wheel;

means for comparing the processed wheel speed signals and generating a signal VwH representing the highest wheel speed;

means for filtering the signal VwH using a limiting filter to generate a signal Vv representing an estimated vehicle speed, where said filter apples restricted limits so that the acceleration and the deceleration of the signal VwH are restricted to predetermined ranges;

means for processing the signal VwH to generate the signal dVwH/dt representing the acceleration and deceleration of the signal VwH;

mean for preocessign the signals Vv and VwH to generate the signal E, representing the difference between Vv and VwH;

means for using the signals dVwH/dt and E to read a map to re-set the acceleration and deceleration follow-up limits; and means for controlling the brakes, said controlling means responsive to at least the signal Vv.

13. The anti-lock control apparatus according to claim 12, further comprising:

means for reading a map where the abscissa axis of said map represents the difference, E, and the ordinate thereof represents the acceleration and deceleration, dVwH/dt.

14. The anti-lock control apparatus according to claim 13, further comprising:

means for processing the signal Vv to generate a signal representing the deceleration and acceleration of the signal Vv;

means for processing the signal generated by the previous apparatus to generate a signal $\mu$, representing the degree of friction coefficient of the road surface; and means for processing the signal $\mu$ to generate different scales for the abscissa and ordinate axes, respectively, of the map of follow-up limits.

* * * * *